US012665099B2

(12) United States Patent
Johnson et al.

(10) Patent No.: US 12,665,099 B2
(45) Date of Patent: Jun. 23, 2026

(54) CONTINUOUS REMOVAL OF FISSION PRODUCTS FROM MOLTEN-SALT FUELED NUCLEAR REACTORS

(71) Applicant: Muons, Inc., Batavia, IL (US)

(72) Inventors: Rolland Paul Johnson, Newport News, VA (US); Thomas J. Roberts, Batavia, IL (US); Bruce Kevin McNamara, Kennewick, WA (US); Robert Bruce Vogelaar, Blacksburg, VA (US)

(73) Assignee: Muons, Inc., Batavia, IL (US)

( * ) Notice: Subject to any disclaimer, the term of this patent is extended or adjusted under 35 U.S.C. 154(b) by 588 days.

(21) Appl. No.: 18/055,764

(22) Filed: Nov. 15, 2022

(65) Prior Publication Data

US 2023/0154636 A1 May 18, 2023

Related U.S. Application Data

(60) Provisional application No. 63/279,635, filed on Nov. 15, 2021.

(51) Int. Cl.
*G21C 19/307* (2006.01)
*G21C 19/50* (2006.01)

(52) U.S. Cl.
CPC ........... *G21C 19/307* (2013.01); *G21C 19/50* (2013.01)

(58) Field of Classification Search
CPC ....... G21C 19/30; G21C 19/307; G21C 19/50
See application file for complete search history.

(56) References Cited

U.S. PATENT DOCUMENTS

| | | | | |
|---|---|---|---|---|
| 1,329,559 | A | 2/1920 | Nikola | |
| 3,861,998 | A * | 1/1975 | Okrent | G21C 19/307 976/DIG. 30 |
| 3,895,930 | A | 7/1975 | Campolong | |
| 4,141,705 | A | 2/1979 | Campolong | |
| 7,998,251 | B2 | 8/2011 | Pondelick et al. | |
| 9,903,536 | B2 | 2/2018 | Lin et al. | |
| 10,602,638 | B2 | 3/2020 | North et al. | |
| 11,413,631 | B2 | 8/2022 | Meirav et al. | |

(Continued)

FOREIGN PATENT DOCUMENTS

| | | |
|---|---|---|
| EP | 2766909 | 6/2016 |
| JP | 2014081213 | 5/2014 |

(Continued)

OTHER PUBLICATIONS

Briggs, R. B., "Molten-Salt Reactor Program Semiannual Progress Report for Period Ending Feb. 28, 1966", (ORNL-3936), Oak Ridge National Laboratory, (1966), 234 pgs.

(Continued)

*Primary Examiner* — Sharon M Davis
(74) *Attorney, Agent, or Firm* — Schwegman Lundberg & Woessner, P.A.

(57) ABSTRACT

An example for continuous removal of fission products from a molten-salt fueled nuclear reactor enclosed in a reactor containment may include separating actinides from other fission products flowing out of the reactor, returning the separated actinides back to the reactor to be consumed, and removing the other fission products out of the containment while the reactor is operating. In various embodiments, the reactor can be a critical reactor, a subcritical (e.g., accelerator-drive) reactor, or another type of reactor.

9 Claims, 2 Drawing Sheets

(56) References Cited

U.S. PATENT DOCUMENTS

| | | | | |
|---|---|---|---|---|
| 11,767,979 | B2 | 9/2023 | Liu et al. | |
| 12,098,848 | B2 | 9/2024 | Liu et al. | |
| 2015/0078504 | A1 * | 3/2015 | Woolley | G21D 1/00 376/181 |
| 2025/0046483 | A1 | 2/2025 | Johnson | |

FOREIGN PATENT DOCUMENTS

| | | |
|---|---|---|
| KR | 101047838 | 7/2011 |
| WO | 2018026536 | 2/2018 |
| WO | 2023087028 | 5/2023 |

OTHER PUBLICATIONS

Conocar, O., et al., "Extraction behaviour of actinides and lanthanides in a molten fluoride/liquid aluminum system", Journal of Nuclear Materials, 344, (2005), 136-141.

Ferris, L. M., et al., "Distribution of lanthanide and actinide elements between molten lithium halide salts and liquid bismuth solutions", Journal of Inorganic and Nuclear Chemistry, vol. 34, (1972), 2921-2933.

Merk, B., et al., "Demand driven salt clean-up in a molten salt fast reactor—Defining a priority list", PLoS One, 13(3), 0192020, (2018), 20 pgs.

Sense, K. A., et al., "Vapor pressure and derived information of the sodium fluoride zirconium fluoride system. Description of a method for the determination of molecular complexes in the vapor phase,", J. Physical Chemistry Vol 61, (1956), 337-344.

Van Der Kemp, W. J. M., et al., "The vapour composition and pressure over solid potassium chloride: new mass-spectrometric results and effusion masses", The Journal of Chemical Thermodynamics, vol. 23, Issue 6, (Jun. 1991), 593-604.

Wang, L. L., et al., "Communication: Vacuum Evaporation of KCl-NsCl Salts: Part I. Thermodynamic Modeling of Vapor Pressures of Solid and Liquid Solutions", Metallurgical Transactions, B, vol. 27, Issue 1, (Feb. 1996), 141-46.

Zhang, J., et al., "Impurities in Primary Coolant Salt of FHRs: Chemistry, Impact and Removal Methods", Energy Technology, 1900016, (2019), 13 pgs.

Ritchie, Hannah, "What are the safest and cleanest sources of energy?", [Online]. Retrieved from the Internet: <https://ourworldindata.org/safest-sources-of-energy#article-citation>, (Feb. 10, 2020), 16 pages.

"International Application Serial No. PCT US2022 079898, International Search Report mailed Apr. 4, 2023", 3 pgs.

"International Application Serial No. PCT US2022 079898, Written Opinion mailed Apr. 4, 2023", 4 pgs.

"International Application Serial No. PCT US2022 079898, International Preliminary Report on Patentability mailed May 30, 2024", 6 pgs.

Johnson, Rolland, et al., "Mu STAR: A Modular Accelerator-Driven Subcritical Reactor Design", Proceedings of the 10th Int. Particle Accelerator Conf. (IPAC2019), Melbourne, Australia pp. 3555-3557, (May 2019), 3 pages.

* cited by examiner

CONTINUOUS REMOVAL OF FISSION PRODUCTS FROM MOLTEN-SALT FUELED NUCLEAR REACTORS

CLAIM OF PRIORITY

The present application claims the benefit of priority under 35 U.S.C. § 119(e) of U.S. Provisional Patent Application No. 63/279,635, entitled "CONTINUOUS REMOVAL OF FISSION PRODUCTS FROM MOLTEN-SALT FUELED REACTORS", filed Nov. 15, 2021, which is herein incorporated by reference in its entirety.

TECHNICAL FIELD

This document relates generally to molten-salt nuclear reactors and more particularly, but not by way of limitation, a system and method for continuous removal of fission products from a molten-salt fueled nuclear reactor.

BACKGROUND

Nuclear reactors generate fission products when operating to generate power. In an example of an existing nuclear power generation system using a molten salt fueled reactor, fission products are removed from the reactor containment and transported to a separate processing facility. The process interrupts the operation of the reactor, is costly, and raises safety, environmental, and proliferation concerns that hinder the acceptance of nuclear energy.

SUMMARY

An example for continuous removal of fission products from a molten-salt fueled nuclear reactor enclosed in a reactor containment may include separating actinides from other fission products flowing out of the reactor, returning the separated actinides back to the reactor to be consumed, and removing the other fission products out of the containment while the reactor is operating. In various embodiments, the reactor can be a critical reactor, a subcritical (e.g., accelerator-drive) reactor, or another type of reactor.

An example of a system for continuous removal of fission products from a nuclear reactor enclosed in a reactor containment is also provided. The system may include a first fuel conduit coupled to the reactor and positioned within the reactor containment, a separation device coupled to the first fuel conduit and positioned within the reactor containment, a second fuel conduit coupled between the separation device and the reactor and positioned within the reactor containment, and a fission product conduit coupled to the separation device. The first fuel conduit may be configured to receive a side stream of a molten-salt fuel including actinides and other fission products flowing out of the reactor while the reactor is operating. The separation device may be configured to receive the side stream and to treat the received side stream to isolate the actinides and produce side stream remnants. The side stream remnants may include the other fission products. The second fuel conduit may be configured to feed the treated side stream including the isolated actinides back into the reactor for power generation and destruction of the isolated actinides in the reactor. The fission product conduit may be configured to allow for removal of the side stream remnants from the reactor containment while the reactor is operating.

An example of a method for continuous removal of fission products from a nuclear reactor enclosed in a reactor containment is provided. The method may include producing a side stream of a molten-salt fuel flowing out of the reactor. The side stream includes actinides and other fission products and allows for continuous access to the fuel within the reactor containment while the reactor is operating. The method may further include treating the side stream to isolate the actinides and produce side stream remnants (including the other fission products) within the reactor containment, injecting the treated side stream including the isolated actinides back into the reactor for power generation and destruction of the isolated actinides in the reactor, and removing the side stream remnants from the reactor containment.

This Summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

The drawings illustrate generally, by way of example, various embodiments discussed in the present document. The drawings are for illustrative purposes only and may not be to scale.

DETAILED DESCRIPTION

Figure 1:
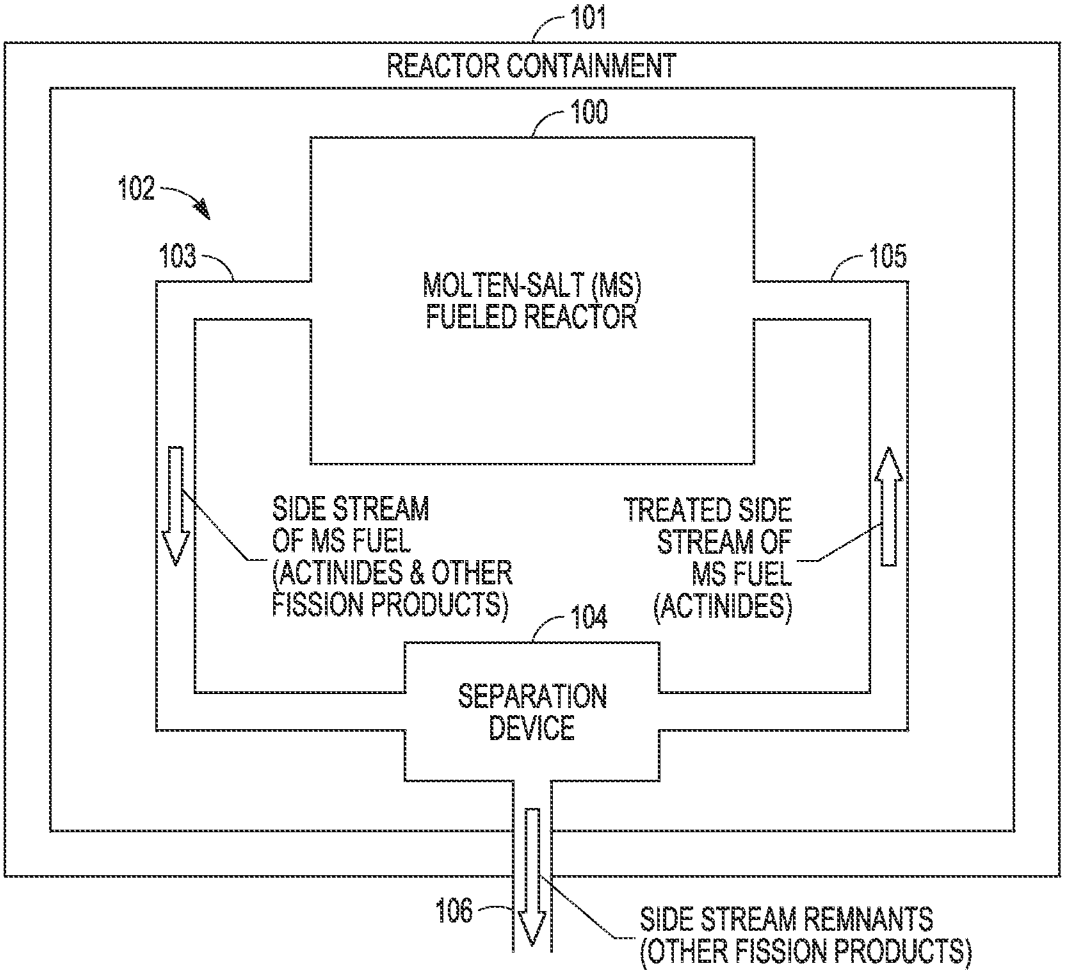
FIG. 1 illustrates an embodiment of a system for continuous removal of fission products from a molten-salt fueled subcritical nuclear reactor and portions of an environment in which the system is positioned and operates.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized, and that structural, logical and electrical changes may be made without departing from the spirit and scope of the present invention. References to "an", "one", or "various" embodiments in this disclosure are not necessarily to the same embodiment, and such references contemplate more than one embodiment. The following detailed description provides examples, and the scope of the present invention is defined by the appended claims and their legal equivalents.

This document discusses, among other things, a system and method for extracting fission products (FPs) from operating molten-salt (MS) reactors. The present system is based on methods of separation of molten salt components, including separation by mass of volatilized molten salt fuel or by liquid-liquid contact methods using liquid metal, and can be applied to critical reactors, subcritical reactors including accelerator-driven subcritical reactors, or other types of reactors fueled by molten salts containing dissolved fissile and/or fertile materials including spent nuclear fuel (SNF), including any past, present, or future reactors. Actinides remain in the reactor to produce profitable energy and be transmuted while the extracted FPs can be buried without long-lived actinides such that a geologic repository is not necessarily needed to close the nuclear fuel cycle. In particular, by removing neutron-absorbing FPs and operating subcritically, where the restrictive link between operation and criticality is broken, complete burnup of the SNF fuel can be achieved. Implementing this separation approach in a subcritical reactor is discussed in this document as an example of application of the present system, which can be applied to various subcritical and non-subcritical reactors. The present system continuously processes the molten salt inside the reactor while the reactor operates, without the need for a separate plant. This simultaneously improves the neutronics of the reactor, increasing the burnup of the fuel and extending its useful life for generating energy.

Besides the method of separation of actinides by mass or using a liquid metal medium to isolate non-volatile FPs, a helium purge can be used to remove volatile FPs at normal operating temperature such that the inventory of volatile radioactive isotopes in the core can be reduced by orders of magnitude compared to solid-fuel systems. This feature, with subcriticality, may allow for fewer regulatory burdens for construction and operation, as well as popular acceptance. The present system is a dramatically simpler and cost-effective solution to the SNF problem when compared to existing systems, and provides intrinsic proliferation resistance by not removing fissile material from the core containment, and not requiring enriched uranium for operation. This transformative solution to use the enormous remaining energy in the fertile U238 of the SNF while economically disposing of the mostly short-lived remnants is best enabled by an accelerator-driven subcritical reactor leveraging decades of groundbreaking technological developments of superconducting radio-frequency (RF) cavities needed for the neutron-producing accelerator.

A subcritical reactor is a nuclear fission reactor that produces fission without the need for criticality (keff<1). Instead of a self-sustaining chain reaction, an accelerator-driven subcritical reactor uses an accelerator to provide neutrons for subcritical operation of the reactor (where the output power is proportional to the beam power, also referred to as an "energy amplifier"). An example of the accelerator-driven subcritical reactor is Mu*STAR, which is discussed, for example, in Rolland Johnson et al., "Mu*STAR: A Modular Accelerator-Driven Subcritical Reactor Design", *Proceedings of the* 10*th Int. Particle Accelerator Conf.* (*IPAC*2019), Melbourne, Australia (May 2019), 3555-3557, which is incorporated herein by reference in its entirety. The accelerator-driven subcritical reactor is enclosed in a reactor containment (also referred to as containment building, containment shell, containment vessel, or the like) that is designed to prevent or limit FPs produced by operation of the reactor from being released into the environment.

FIG. 1 illustrates an embodiment of a system 102 for continuous removal of fission products from a molten-salt (MS) fueled nuclear reactor 100 enclosed in a reactor containment 101. Reactor 100 can be a critical reactor or an accelerator-driven subcritical reactor. System 102 includes a side stream conduit 103 coupled to reactor 100 and positioned within reactor containment 101, a separation device 104 coupled to conduit 103 and positioned within reactor containment 101, a treated side stream conduit 105 coupled between separation device 104 and reactor 100 and positioned within reactor containment 101, and a fission product conduit 106 coupled to separation device 104. Conduit 103 can receive a side stream of an MS fuel flowing out of reactor 100 while reactor 100 is operating. The received side stream includes actinides and other fission products. Separation device 104 can receive the side stream from conduit 103 and treat the received side stream to produce isolated actinides and side stream remnants. The side stream remnants include the other fission products without the isolated actinides. Conduit 105 can feed the treated side stream including the isolated actinides back into reactor 100 for power generation and destruction of the isolated actinides in reactor 100. Fission product conduit 106 allows for removal of the side stream remnants from reactor containment 101 while reactor 100 is operating.

In one embodiment, separation device 104 includes a mass separation device that can volatilize the fuel in the received side stream and separate the actinides by mass using centrifugation. Examples of such a mass separation device include a vortex separator and a Tesla-valve based separator (a modified Tesla valve). In another embodiment, separation device 104 includes a liquid-metal separation device that introduces a molten metal into the received side stream. The actinides and other FIN in the received side stream migrate to a contactor containing the liquid-metal. The liquid metal reduces actinides and other FPs that are separable by established chemical methods. The actinide fraction is transferred to a carrier MS for reinjection into the reactor. The remnant FPs are similarly removed. In various embodiments, separation device 104 can perform any method of separation discussed in this document. In various embodiments, separation device 104 can produce the side stream remnants with the fission products having a radiotoxicity lifetime for which a geological repository is not required. The separation of the isolated actinides and side stream remnants as performed by separation device 104 can be performed within containment 101 without interrupting the operation of reactor 100, allowing for safe, continuous removal of the fission products without the need of a separate plant. In various embodiments, separation device 104 can produce the side stream remnants with the fission products having a radiotoxicity lifetime for which a geological repository is not required.

Figure 2:
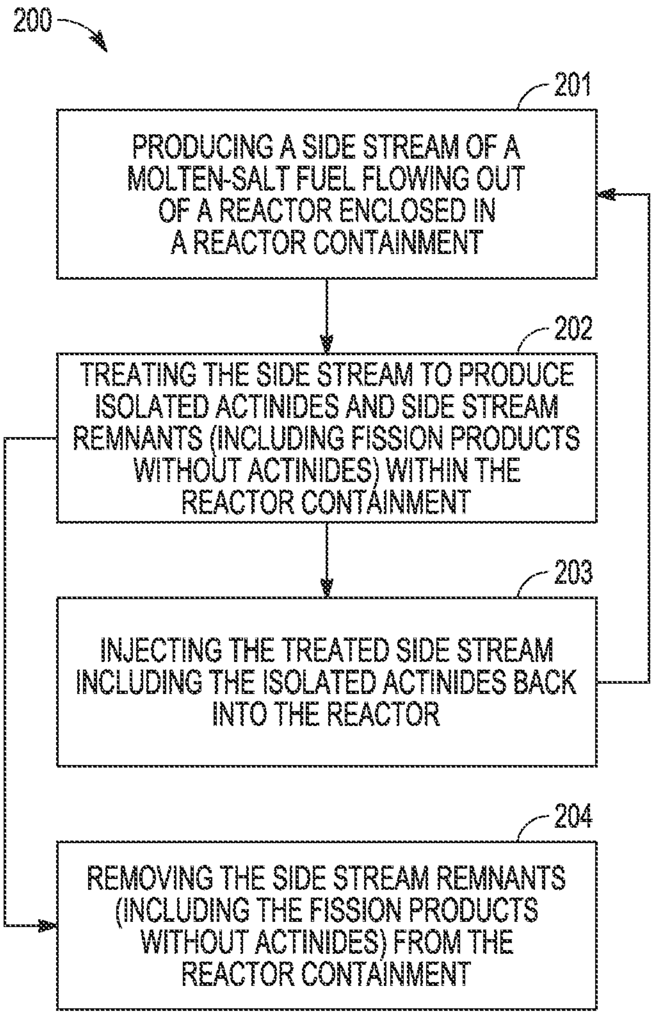
FIG. 2 illustrates an embodiment of a method for continuous removal of fission products from a molten-salt fueled subcritical nuclear reactor that can be performed within the containment of the reactor while the reactor is operating.

FIG. 2 illustrates an embodiment of a method 200 for continuous removal of fission products from an MS fueled nuclear reactor (e.g., reactor 100) that can be performed within the containment enclosing the reactor (e.g., containment 101) while the reactor is operating. In various embodiments, method 200 can be performed using system 102.

At 201, a side stream of an MS fuel flowing out of the reactor is produced. The side stream includes actinides and other fission products and allows for continuous access to the fuel within the reactor containment while the reactor is operating.

At 202, the side stream is treated to produce isolated actinides and side stream remnants within the reactor containment. Examples of the actinides include uranium (U), plutonium (Pu), americium (Am), and curium (Cm). The side stream remnants include fission the other products (e.g., lanthanides).

In one embodiment, the treatment of the side stream includes separation by mass. The fuel in the side stream is volatilized, and the isolated actinides and side stream remnants are separated from each other by mass using centrifugation. The separation by mass can be performed, for example, using a vortex separator or a Tesla-valve based separator.

In another embodiment, the treatment of the side stream includes use of molten metal. An example of the molten metal that can be used for this purpose is bismuth. See, for example, L. M. Ferris F. J. Smith, J. C. Mailen, M. J. Bell, "Distribution of lanthanide and actinide elements between molten lithium halide salts and liquid bismuth solutions," *J. Inorg, Nucl. Chem.*, Vol. 34, 1972, 2921-2933. Another example of the molten metal that can be used for this purpose is aluminum. See, for example, O Conocar, N. Douyere, J. Lacquement, "Extraction behavior of actinides and lanthanides in a molten fluoride/liquid aluminum system," *J. Nucl. Materials*, Vol. 344 (1-3), 2005, 136-141.

At 203, the treated side stream including the isolated actinides is injected back into the reactor for power generation and destruction of the isolated actinides in the reactor. This increases fuel efficiency and the efficiency of the reactor as the fuel does not need to be removed from the reactor containment to be reprocessed.

At 204, the side stream remnants are removed from the reactor containment. This can be done without interrupting the operation of the reactor. In various embodiments, the side stream remnants separated from the side stream have a radiotoxicity lifetime for which a geological repository is not required. Such a radiotoxicity lifetime can be around 300 years before it reaches that of uranium ore. This facilitates processing of fission products to prevent from their weaponization, ensure nonproliferation, and provide safeguards (material accountancy).

In various embodiments, after being removed from the reactor containment, the side stream remnants including the fission products can be processed to extract one or more isotopes that can be used, for example, for medical applications including therapeutical and/or diagnostic uses.

The present subject matter including system 102 and method 200 can be applied to nuclear power generation with substantially increased efficiency, decreased cost, and increased safety when compared to existing nuclear power generation systems. Various aspects of system 102 and method 200 are further discussed below.

The separation between actinides and volatilized fission products can be done by mass rather than by chemical means. In a molten-salt (MS) fueled reactor like the Oak Ridge National Laboratory (ORNL) Molten-Salt Reactor Experiment (MSRE), a side stream of fuel can be split off within the reactor containment, heated to volatilize all components, and separated into components as a function of mass using known diffusion or centrifugal techniques. In one scheme the low-mass band of the carrier salt is separated first, followed by the high-mass band of actinides. These are returned to the reactor, and the middle band thus remaining, largely fission products, collected and ultimately removed. In practice, the eutectic nature of the salt may alter how the vapor phases evolve and alter this simple model.

The fission products, which include mostly short-lived isotopes and no actinides, then can be removed from the reactor for permanent burial without needing a geologic repository to close the fuel cycle. The actinides, which stay in the MS fuel, can continue to be both bred, and burned in the reactor. With an accelerator-driven subcritical reactor where the restrictive link between operation and criticality is broken, the burning can continue for very deep burns of all the fertile and subsequent fissile materials. Nearly complete burnup and very inexpensive power can be expected such that SNF becomes a commodity fuel rather than waste to be buried.

In short, continuously removing the FPs from an operating reactor and leaving the actinides in it allows (1) deep burns because fission-product neutron poisons are removed, and (2) FPs to be buried without geologic requirements because they are not mixed with actinides. There are even more advantages with a subcritical reactor that are discussed below.

The present subject matter can simultaneously solve the problems of, among other things, accumulated SNF, expensive nuclear power, and climate change related to nuclear power generation. Issues such as what happens when fluorinated SNF fuel in a eutectic carrier salt is heated to high temperatures to volatilize it can be resolved by, for example, 1) measuring the rates of volatilization for components of the MS fuel as a function of temperature, 2) develop concepts for vortex/centrifugal or diffusion systems to do mass separation in the extreme environment near an active nuclear core, especially taking advantage of additive manufacturing techniques, 3) prototyping a mass separation device, 4) computational support for the design and prototype, and 5) simulating the effects of the FP removal on reactor dynamics for the Mu*STAR accelerator-driven subcritical reactor.

It is believed that the most responsible method to close nuclear fuel cycles and produce the lowest volume of radiolytic waste product is through the transmutation of the actinide population(s) in unwanted nuclear materials (NM) such as used-fuel or plutonium. A common benefit that is often cited for MS reactors is the reduced need to refuel the reactor for extended periods of time. For reactor types that would burn unwanted used fuel or plutonium, resupply of the fissile NM is necessary. Depending on the reactor type, deeper burn times may be required to transmute actinide populations prior to a subsequent refueling with the unwanted NM. For all MS reactor types, neutron poisons grow in and increasingly conflict with the extended operation of the reactor. Additionally, the increase in the general FP population becomes a radiolytic burden on the materials of construction. Radiolysis of the fuel salt is oxidative overall and contributes to an evolution of corrosion mechanisms that are time, salt and reactor type dependent. Moreover, radiolytic embrittlement of functional reactor parts is life-threatening to extended operations. Thus a method to address the growth of FPs in MS reactors and prevent their overgrowth is on a critical path towards: (1) closing the nuclear fuel(s) cycle of MS reactors with a minimized radiolytic waste product, and (2) the general development of all molten-salt technologies.

There are two approaches historically considered for removal of the largest source of neutron poisons, the lanthanides, from an MS fuel. Prior to the operation of the MSRE, the MS reactor campaign advanced bench scale methods for the reductive extraction of the lanthanides in liquid bismuth (Bi) from the MS: LiF—$BeF_2$—$ZrF_2$ (65-30-5 mole %). L. M. Ferris F. J. Smith, J. C. Mailen, M. J. Bell, Distribution of lanthanide and actinide elements between molten lithium halide salts and liquid bismuth solutions, *J. Inorg, Nucl. Chem.*, Vol. 34, 1972, 2921-2933. Procedures for stripping the metallic FPs from the liquid Bi for their disposal were developed. The liquid Bi extraction of trivalents (the lanthanides, Am, Cm, PuF3) was demonstrated at bench scale during the MSR campaign, including not only extraction by the liquid Bi, but also their recovery from it. This was done with mixer settler type equipment rather than centrifugal contactors or otherwise. This type of contactor set up generally (e.g., for plutonium uranium reduction extraction (PUREX)) uses a set of contactors. The MS flows to each contactor. Each contactor has a separate function. Such setups exist at Pacific Northwest Laboratory (PNL) for PUREX-like separations. They are all rigged up with ultra-violet (UV) vis and Raman spectroscopy for online monitoring of the comings and goings of various species. A similar set of contactors can be used to isolate the actinides from the liquid bismuth. Significantly, these methods may be generally applicable to several MS reactor types. A downside of this general approach is that a slip stream of the fuel salt would be passed to a fuel processing facility nearby the reactor. In the case of the MSRE, this would have required a shutdown of the reactor for transfer of the fuel salt, or at least smaller volumes of it, from the reactor. Trivalent plutonium would be extracted with the lanthanides. Since the plutonium would be outside the reactor containment, a potential for its removal is inherent in the method.

An alternative approach was distillation of the salt. R. B. Briggs, Molten-salt reactor program. Progress report for the period ending Feb. 28, 1966. ORNL-3936, 1966. It was recognized that the vapor pressures of the lanthanide fluorides are fairly low, that is their boiling points are above 2200° C., whereas the vapor pressure of LiF—$BeF_2$—$ZrF_2$ is such that it can be distilled near 1000° C. Consequently, it was envisioned that the salt might simply be distilled from an entire class of FPs and this represents a major win. However, problems still revolve around (1) discontinuous reactor operation and (2) proliferation.

To address such issues, the present subject matter provides mass-based, and temperature-assisted gas phase methods that will remove FPs from MS fuel during reactor operation without the removal of large process volumes from the reactor containment. In effect, the large external fuel reprocessing units as proposed in the molten salt reactor campaign will be replaced by small units placed inside the reactor containment. Separating just the fission products and keeping the actinides inside the reactor core removes the stigma associated with possible proliferation concerns that are inherent in most fuel processing schemes. In particular, removal of all masses up to and including the lanthanides from the fuel salt can be achieved by applying the present subject matter. Method 200 does not remove the actinides from the side stream of MS fuels but injects them back to the reactor to be consumed as fuel. Method 200 can be performed on liter-sized batches of fuel salt per hour in a continuous mode using, for example, vortex or centrifugal separation in devices built with additive technologies.

In various embodiments, separation device 104 can be designed to address one or more of the following issues related to the separation by mass:

The fuel salt itself may change composition on its distillation. Even if this change is small, repeated distillation can shift the physical characteristics of the salt. To the extent that only the fission-products were removed, and everything else returned, this should not be a problem. The treated salt composition can be ascertained prior to its reintegration with the reactor fuel salt. Compositional deficiencies can be adjusted online.

Because of salt component interactions, important actinides such as $AmF_3$, $PuF_3$ may be induced into the vapor phase as mixed cation species (cations present in the fuel salt). The vapor phase composition of these complexes is unlikely to persist in the fuel salt to which they would be returned, but even so the volatility of actinides in whatever complexed form constitutes their mass separation.

As noted above, mass separation may additionally be foiled by oligomerization of salt components. A temperature assisted, mass separations approach then requires assessment of volatility data of the fuel salt and its components. High temperature data allowing for continuous removal of fission products from within the core containment region can be obtained. The obtained data can be used to choose a technology from available technologies determined by the separation of FP required from the fuel salt to maintain desired power production.

Actinides that remain with the fuel salt during distillation, or that certain actinides can be rerouted by their volatility to the final fuel salt, are key to burning actinides in general for the times required, for their removal from the fuel salt (ultimately converting them to fission products). The times required to do this can be determined for the applicable reactor type, methodology, loadings of NM(s), and salt type, among other things.

Computational methods can be used to understand the evolution of FPs, the evolution of important neutron poisons and their removal rate by fuel-salt processing, as well as the times required for deep burn of the actinides to occur. In various embodiment, the method of gas phase separation depends on several features of the vapor phase produced on heating the molten salt. High temperature data can inform chemical fluid dynamics (CFD) or other computational models as to the most effective design for the vapor phase separations.

Cyclonic, hydrocyclonic, vortex separators, and Tesla valves have been developed over several decades and today their industrial use has far outstripped their research. These devices generally have such advantages as simplicity of design, compactness; low production costs, high reliability; significant speed; implementation of several processes simultaneously: phase separation, cooling and heating of the gas flow. Positive qualities of the devices make it possible to make engineering systems manufacturable, speedy, easy to manufacture and operate, safe and even environmentally friendly.

The development of these kinds of devices for separations applicable to the nuclear industry appears to be a suitable area of research especially, in regard to the development of liquid/solid, liquid/gas, and even heat (hot gas-cold gas) separations. The overall improvements in the development of such devices, generally are derived from data-assisted computational fluid dynamics calculations. These devices may provide for economical, efficient methods of achieving several types of separations in molten salt reactors.

For example, a large set of solid/MS liquid species are a major source of concern to all MSR developers. The first bullet below concerns corrosion of the reactor materials of construction (MOC), the second bullet lists metal products that are nanoparticulate and act as a gas, will clog heat exchangers, are neutron poisons and confer a large radiolytic heat load to the reactor MOCs. The last bullet is related to the concern of critically by precipitation of the fertile material.

precipitated corrosion products: NiS, Cr metal, Ni metal, Fe metal

Precipitated metal FP products Nb, Mo, Tc, Ru, Te, Rh,

Precipitated fissile $UO_2$-253, 233, $PuO_2$

The mass separations discussed herein should be a rather simple feat for such devices, while operational issues associated with a compact device that can vaporize the salt, inject the vapor (perhaps with a carrier gas such as helium) into a separation device, and then reject undesirable species require attention during its design. Another area where such devices can have transformational impact includes heat exchangers. In an MS reactor, these are large, costly devices that are corrosion prone. Data acquired from the extreme environments in which these devices operate allows for development of compact vortex-based heat exchangers with improved efficiencies.

In various embodiments, the present subject matter, including system 102 and method 200, provides an intrinsically proliferation resistant separation and does not at any point create a pure fissile separation. Fissile materials are not separated out to leave the core containment and are returned directly into the MS fuel. When U238 is exhausted, breeding stops, and the remaining Pu239 can be used with fresh fuel, or burned subcritically using accelerator produced neutrons to initiate fission chains.

In various embodiments, the present subject matter, including system 102 and method 200, can demonstrate an equivalent throughput processing rate of 1 kg/day for 8 h without any loss of selectivity. While new processes need to be demonstrated at this scale, using surrogates at larger scale and restricting chemistry with particularly hazardous materials to a smaller scale may be justified. The processing rate for removal of FP matches the requirements of the reactor to maintain its power output by keeping the MS fuel in dynamic equilibrium through a 'polishing' side-loop. This eliminates many expensive steps that conventional reprocessing techniques need. It is sized to prevent its parent reactor from, in principle, needing refueling during its lifetime—the output being ideally pure fission-product, and no long-lived actinides.

In various embodiments, the present subject matter, including system 102 and method 200, is either compatible with at least one existing licensed waste form or is codeveloped with a compatible waste form suitable for final geological disposal. The FP waste stream resulting from an application of the present subject matter is anticipated to have the radiotoxicity of natural uranium ore after 300 years, for which geological disposal of the FP waster is not necessary.

It is to be understood that the above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for continuous removal of fission products from a nuclear reactor enclosed in a reactor containment, the method comprising:

producing a side stream of a molten-salt fuel flowing out of the reactor, the side stream including actinides and other fission products and allowing for continuous access to the fuel within the reactor containment while the reactor is operating;

treating the side stream to isolate the actinides and produce side stream remnants within the reactor containment, the side stream remnants including the other fission products;

injecting the treated side stream including the isolated actinides back into the reactor for power generation and destruction of the isolated actinides in the reactor; and removing the side stream remnants from the reactor containment continuously while the reactor is operating.

2. The method of claim 1, wherein treating the side stream to isolate the actinides comprises:

volatilizing the fuel in the side stream, and separating the actinides from the side stream by mass using centrifugation.

3. The method of claim 1, wherein treating the side stream to isolate the actinides comprises:

introducing into the side stream a molten metal to which the actinides migrate;

separating the molten metal with the actinides from the side stream; and purging the actinides from the molten metal to isolate the actinides.

4. The method of claim 3, wherein the molten metal comprises bismuth.

5. The method of claim 3, wherein the molten metal comprises aluminum.

6. The method of claim 1 wherein the reactor is a critical reactor.

7. The method of claim 1, wherein the reactor is an accelerator-driven subcritical reactor.

8. The method of claim 1, wherein producing the side stream of the molten-salt fuel flowing out of the reactor comprises receiving the side stream through a first conduit directly coupled to the reactor and positioned within reactor containment, and injecting the treated side stream including the isolated actinides back into the reactor comprises injecting the treated side stream into the reactor through a second conduit directly coupled to the reactor and positioned within reactor containment.

9. The method of claim 1, further comprising operating the reactor for power generation.

* * * * *